United States Patent
Nicholson

(10) Patent No.: US 11,235,697 B2
(45) Date of Patent: Feb. 1, 2022

(54) TIE DOWN WITH RATCHET

(71) Applicant: Jacen Nicholson, Firestone, CO (US)

(72) Inventor: Jacen Nicholson, Firestone, CO (US)

( * ) Notice: Subject to any disclaimer, the term of this patent is extended or adjusted under 35 U.S.C. 154(b) by 0 days.

(21) Appl. No.: 16/858,216

(22) Filed: Apr. 24, 2020

(65) Prior Publication Data

US 2020/0346575 A1 Nov. 5, 2020

Related U.S. Application Data

(60) Provisional application No. 62/841,707, filed on May 1, 2019.

(51) Int. Cl.
*B60P 7/08* (2006.01)

(52) U.S. Cl.
CPC ............ *B60P 7/083* (2013.01); *B60P 7/0846* (2013.01); *Y10T 24/2175* (2015.01)

(58) Field of Classification Search
CPC .... B60P 7/083; B60P 7/0846; Y10T 24/2175; Y10T 24/2117; Y10T 24/2121; Y10T 24/2113
See application file for complete search history.

(56) References Cited

U.S. PATENT DOCUMENTS

| | | | |
|---|---|---|---|
| 7,100,902 B1* | 9/2006 | Lu | B60P 7/0846 24/69 ST |
| 2008/0307618 A1* | 12/2008 | Huang | B60P 7/083 24/68 CD |
| 2010/0199473 A1* | 8/2010 | Long | B25B 13/02 24/68 CD |

* cited by examiner

*Primary Examiner* — Robert Sandy
*Assistant Examiner* — Michael S Lee
(74) *Attorney, Agent, or Firm* — Craig R. Miles; CR Miles P.C.

(57) ABSTRACT

A tie down capable of sustaining a load includes a drum assembly having an axle and a pair of drum wheels, a pair of slots, a pair of ratchets having gear teeth, and a pawl having a pair of flanges. One of the pair of flanges correspondingly engages in one of the pair of slots disposed within each of the pair of drums. The flanges of the pawl can simultaneously disengage from between the gear teeth of each of the pair of ratchets or simultaneously engage between the gear teeth of each of the pair of ratchets to selectively constrain rotation of the pair of ratchets.

15 Claims, 8 Drawing Sheets

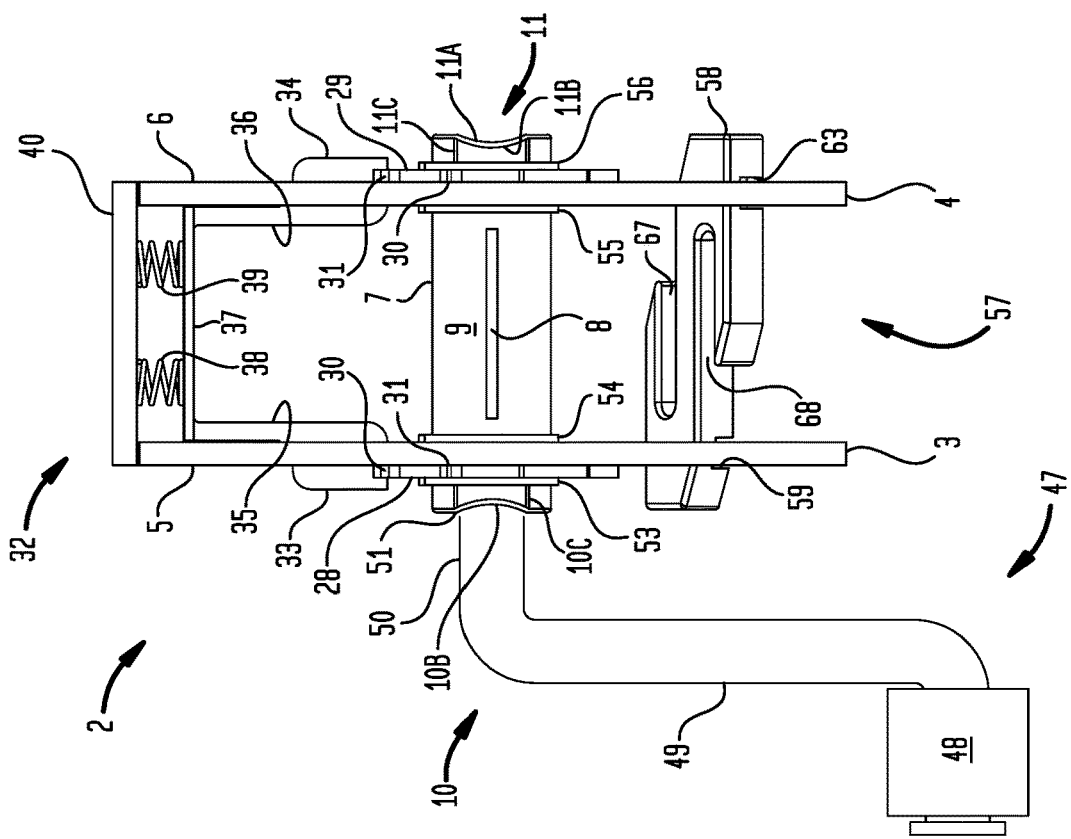
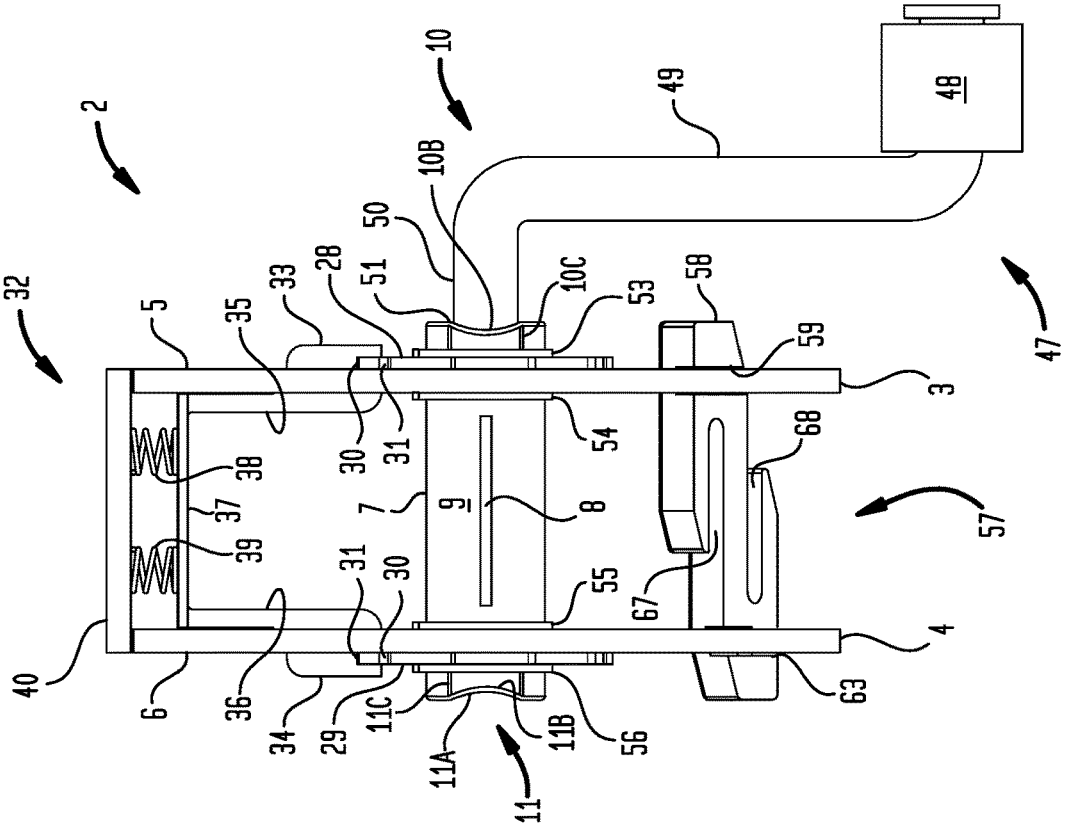

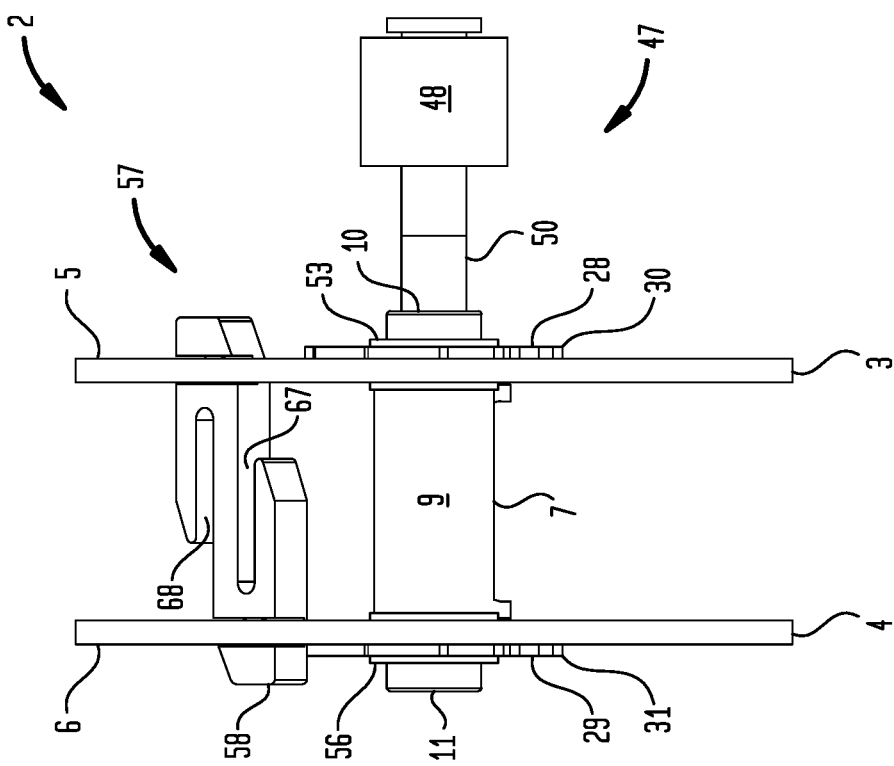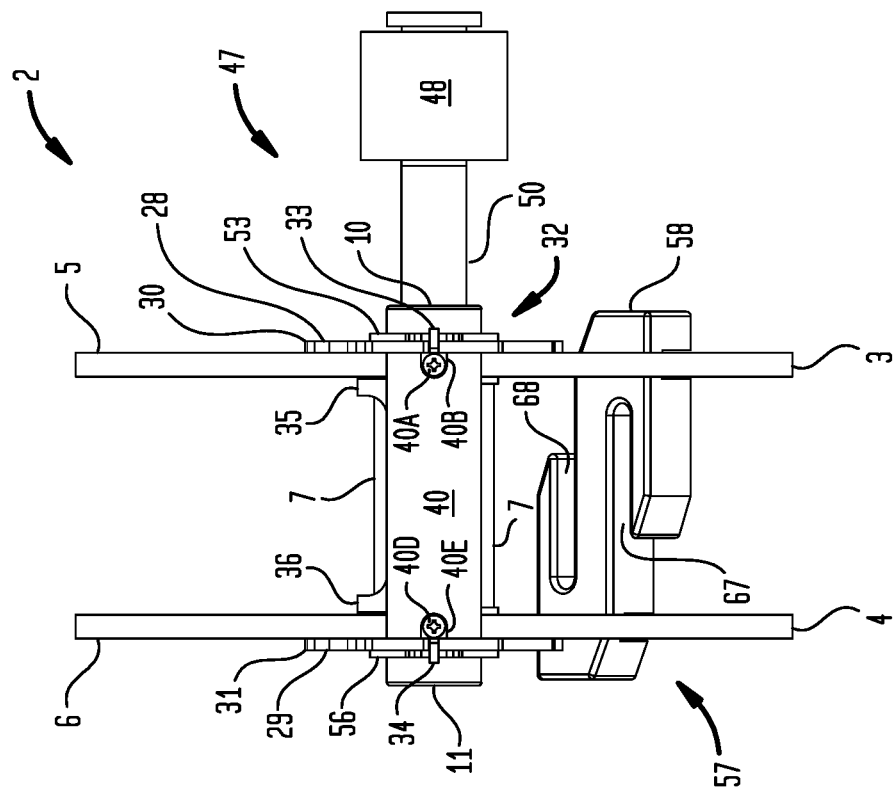

TIE DOWN WITH RATCHET

This United States Non-Provisional patent application claims the benefit of U.S. Provisional Patent Application No. 62/841,707, filed May 1, 2019, hereby incorporated by reference herein.

I. FIELD OF THE INVENTION

Embodiments of the present disclosure relate generally, to tie down devices, and more particularly, relate to tie down devices incorporating a ratchet.

II. BACKGROUND

A tie down with tie down straps and a built-in ratchet tensioner can have a rated weight capacity that makes it a reliable and safe choice for securing cargo or other equipment.

III. SUMMARY OF THE INVENTION

A broad object of embodiments can be a drum assembly including an axle having a slit disposed within an axle sidewall and a pair of drum wheels correspondingly coupled to distal ends of the axle with the slit disposed between the pair of drum wheels, a pair of slots, one of the pair of slots disposed within each of the pair of drum wheels, a pair of ratchets having at least two gear teeth, one of the pair of ratchets coupled to each of the distal ends of the axle adjacent an outward facing side of each of the pair of drum wheels, and a pawl having a pair of flanges. One of the pair of flanges correspondingly slidably engaged in one of the pair of slots disposed within each of the pair of drums. The pair of flanges of the pawl simultaneously slidably engageable between the two gear teeth of each of the pair of ratchets to selectively constrain rotation of the pair of ratchets.

Another broad object of embodiments can be a ratchet strap having a first end removably disposed in the slit of the axle, a second end oppositely disposed from the first end, the second end extending away from the axle, and an elongate member between the first end and the second end, the elongate member wound around the axle sidewall of the axle. A tether member can be removably mounted between the pair of drum wheels radially outward of the axle. At least one strap having a strap first end can be coupled to the tether member.

Naturally, further objects of embodiments are disclosed throughout other areas of the specification, drawings, photographs, and claims.

IV. A BRIEF DESCRIPTION OF THE DRAWINGS

FIG. 6 is a front side view of an embodiment of the drum assembly, pawl, and axle.

FIG. 7 is a rear side view of an embodiment of the drum assembly, pawl, and axle.

FIG. 10 is a top side view an embodiment of the drum assembly, pawl, tether member, and hand crank.

FIG. 11 is a bottom side view of an embodiment of the drum assembly, axle, tether member, and hand crank.

V. DETAILED DESCRIPTION OF THE INVENTION

Figure 1:
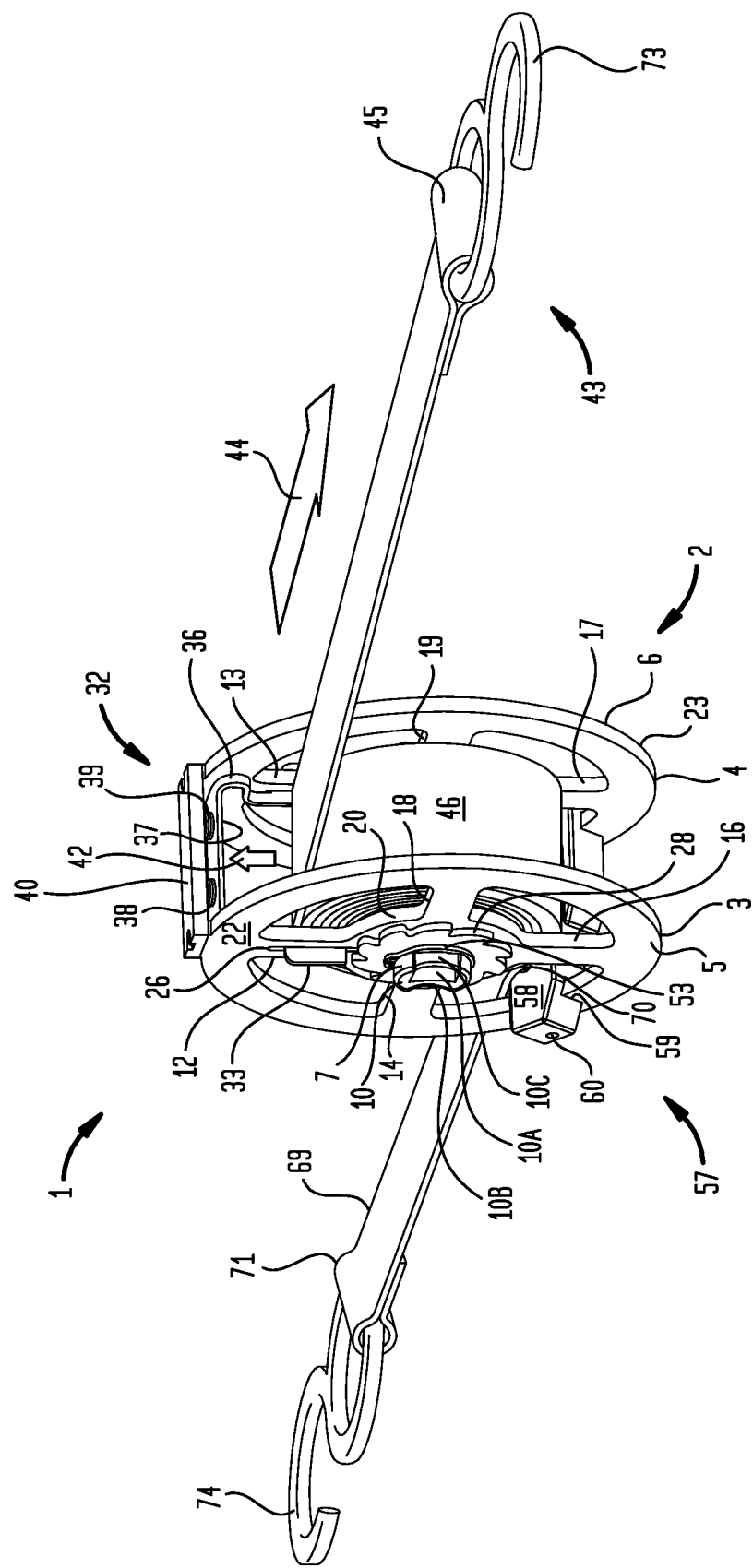
FIG. 1 is a rear, left, perspective view of an embodiment of a tie down with ratchet and a spring-loaded member to actuate a pawl.

Now referring to the figures wherein like reference numerals denote like structure throughout the specification, with reference primarily to FIG. 1, which depicts a ratchet action tie down apparatus (1). In various other embodiments, other types of pistons and levers used with ratchets can, but not necessarily, be used with the ratchet action die down apparatus (1) or "tie down" (1) as used hereafter. As used in the present specification and the appended claims, the term "tie down" is meant to be understood broadly as a come-a-long, or other device that can be used to change or adjust the length of strap, rope, cable or the like between two points.

Figure 2:
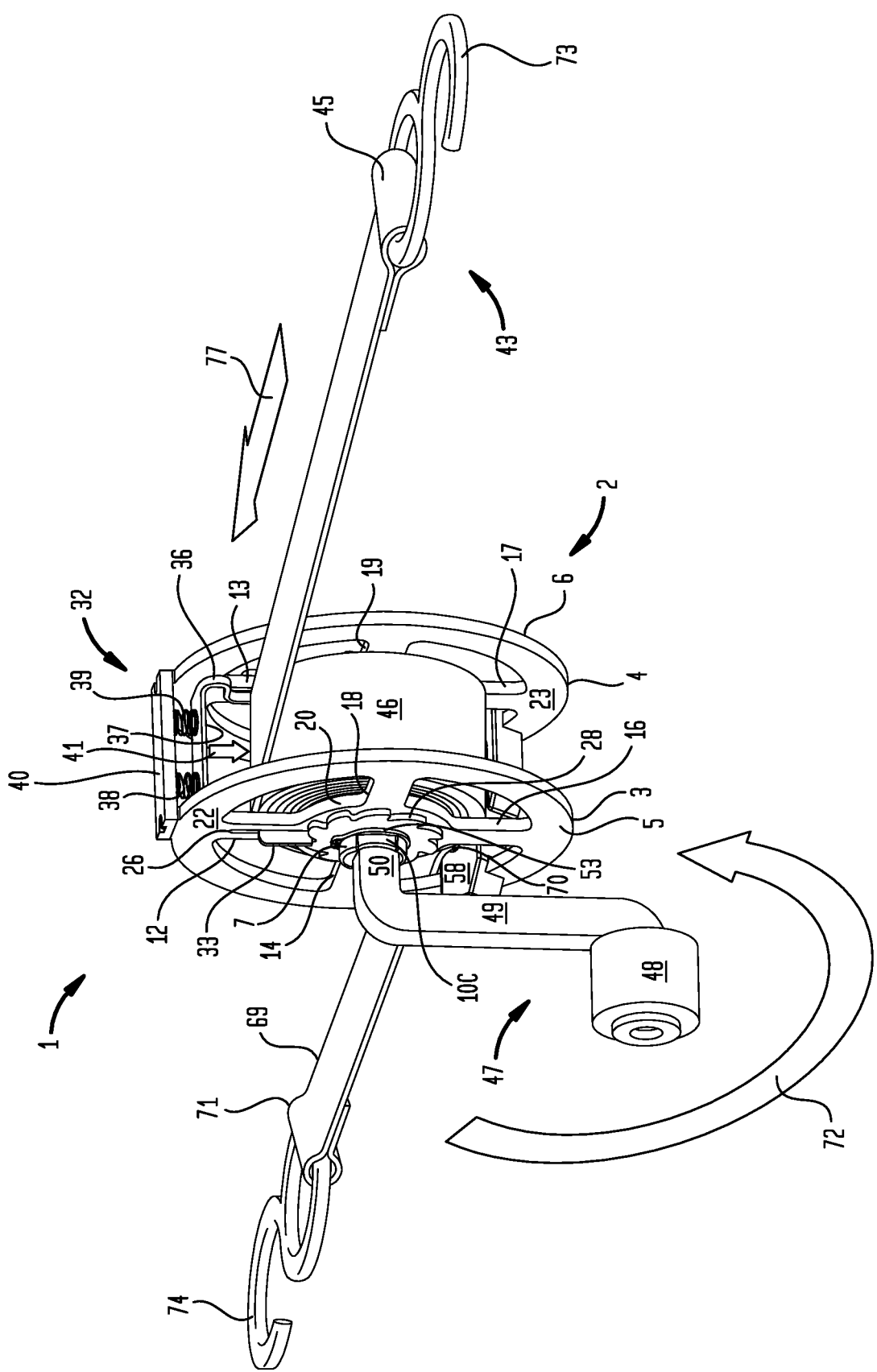
FIG. 2 is a rear, left, perspective view of an embodiment of a tie down with ratchet and a hand crank.
Figure 4:
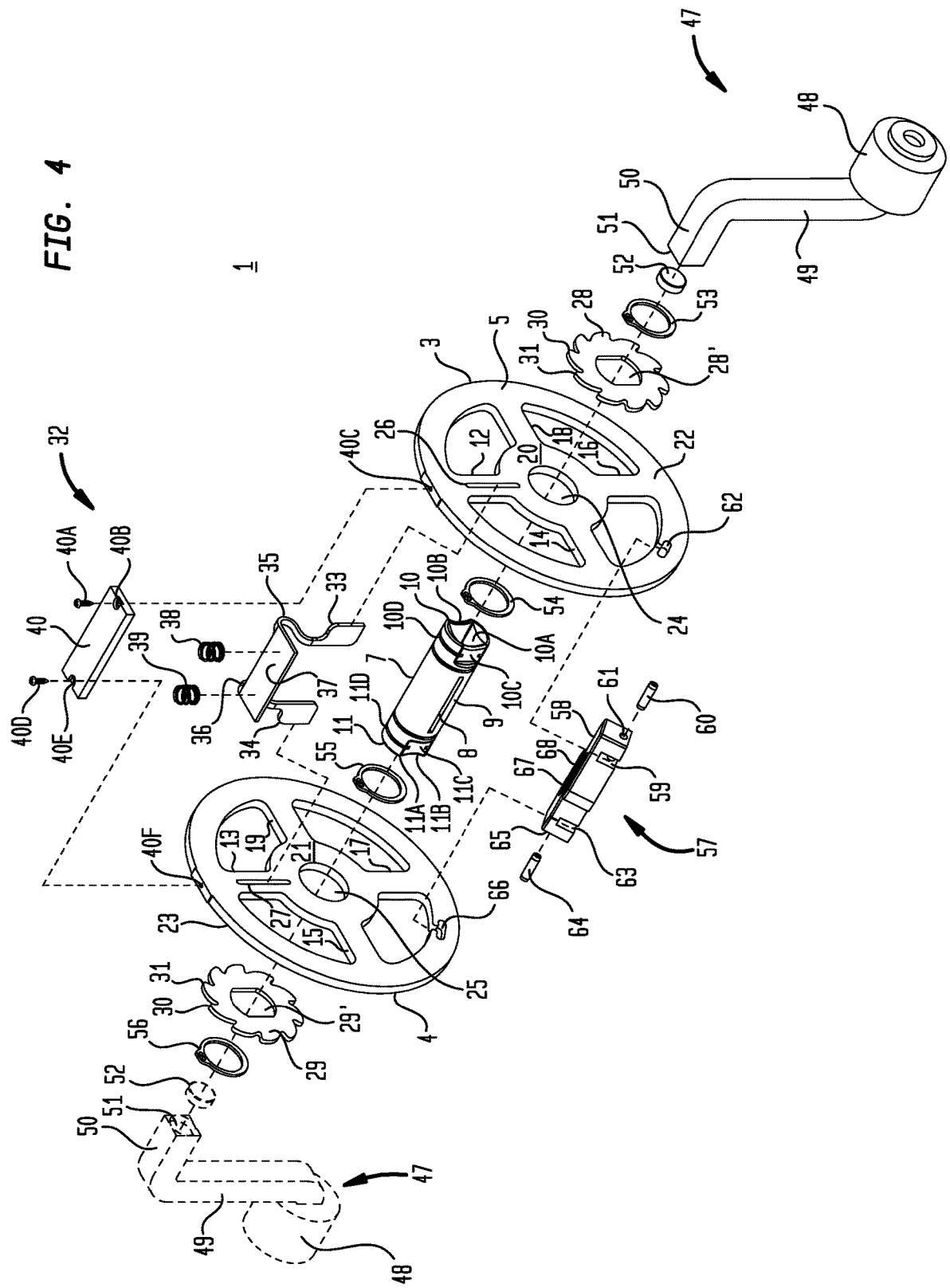
FIG. 4 is a top, left, exploded view of an embodiment of a drum assembly, ratchets, and the hand crank.

With continuing reference, primarily to FIGS. 1, 2, and 4, the drum assembly (2) of the tie down (1) can, but not necessarily, be of a one-piece construction and can be formed of aluminum, steel or cast iron. The drum assembly (2) can be in the form of a spool having opposite circular drum wheels (3) and (4), which can, but not necessarily, have a generally flat circular shape or disc-shaped. Each of the drum wheels (3), (4) include an outward facing side (5), (6). The drum wheels (3) and (4) can be connected by an axle (7) having a slit (8) as a central opening through or partially through an axle sidewall (9). The slit (8) can, but not necessarily, be in the form of a rectangular cross section. The pair of drum wheels (3) and (4) are correspondingly coupled to distal ends (10) and (11) of the axle (7) with the slit (8) disposed between the pair of drum wheels (3) and (4). The drum wheels (3) and (4) of the drum assembly (2) can, but not necessarily, include radial spokes (12, 13, 14, 15, 16, 17, 18, 19) as structures between the center discs (20), (21) and the outer edges (22) and (23) of each of the pair of drum wheels (3) and (4). The spokes (12, 13, 14, 15, 16, 17, 18, 19) converge at each respective center bore (24), (25) formed therethrough each center disc (20), (21).

In various embodiments, the drum wheels (3) and (4) can, but not necessarily, include a collar on each one or both of the outward facing sides (5) and (6). In other embodiments a casing or housing can be used to encapsulate the drum assembly (2) including the drum wheels (3) and (4). The illustrative examples of the drum assembly (2) of the tie down (1) are not intended to preclude embodiments which incorporate similar or equivalent spool and hub devices, currently or prospectively available.

Now referring primarily to FIGS. 1, 2, 4, and 5, the drum wheels (3) and (4) include slots (26) and (27). The slots (26) and (27) are longitudinal, narrow openings, formed within spokes (12) and (13) of the drum wheels (3) and (4). The outward facing sides (5) and (6) of the drum wheels (3) and (4) abut outwardly facing ratchets (28) and (29) with two or more gear teeth (30) and (31) on each ratchet (28), (29). The pair of ratchets (28) and (29), each having two or more gear teeth (30) and (31) can, but not necessarily, include an even, saw-tooth profile. A pawl (32) engages the ratchets (28) and (29) to selectively constrain the axle (7) to rotate in only one direction and to oppose rotation in the other direction. The pawl (32) can include two angular flanges (33) and (34) formed at distally disposed corners of a brackets (35) and (36). Each of the flanges (33) and (34) are shaped to correspondingly slidably engage in the slots (26) and (27) of the drum wheels (3) and (4). The flanges (33) and (34) converge at the corners of a spring-loaded member (37) of the pawl (32).

Figure 5:
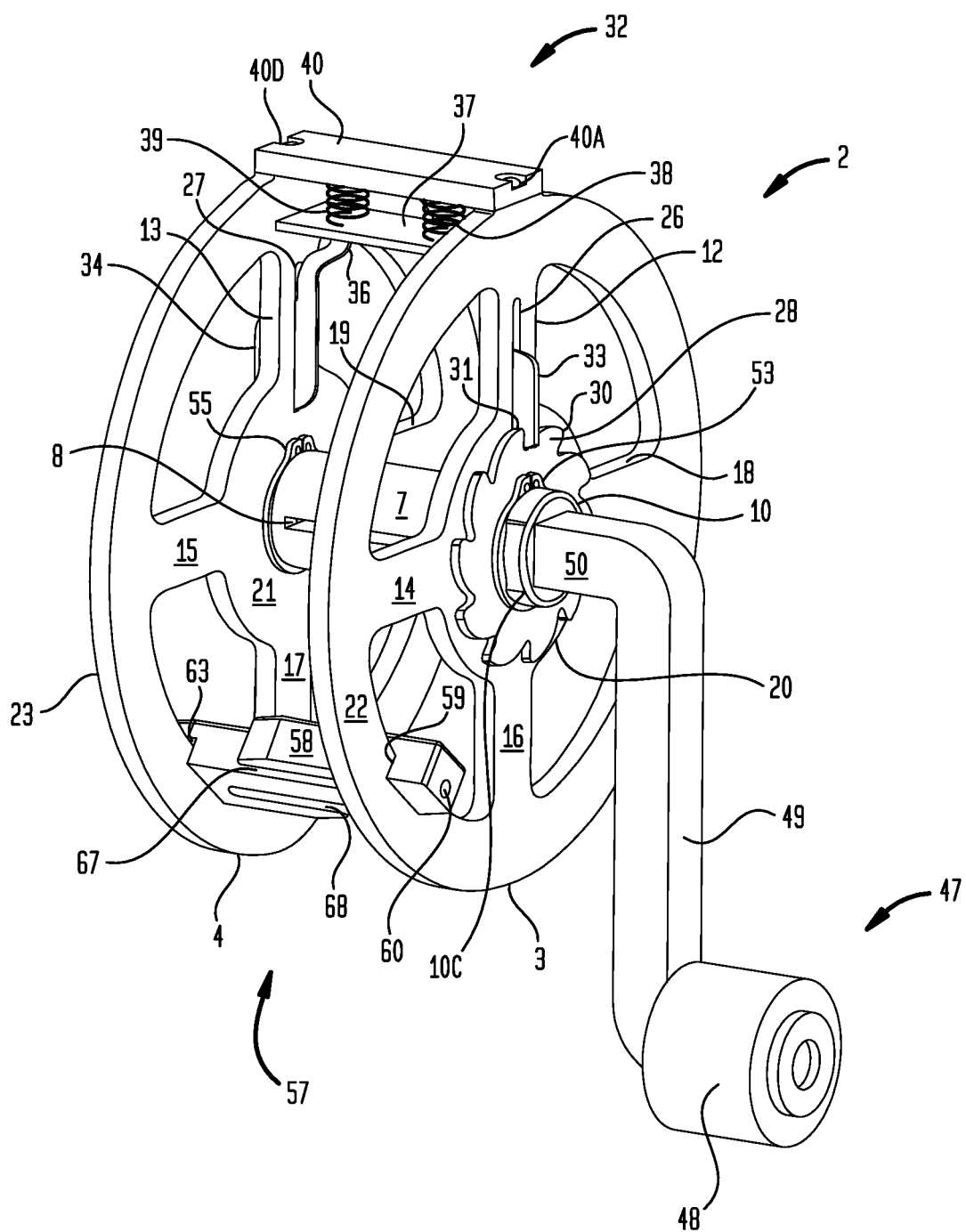
FIG. 5 is a top, left, perspective view of an embodiment of the drum assembly with the hand crank, and a tether member.
Figure 9:
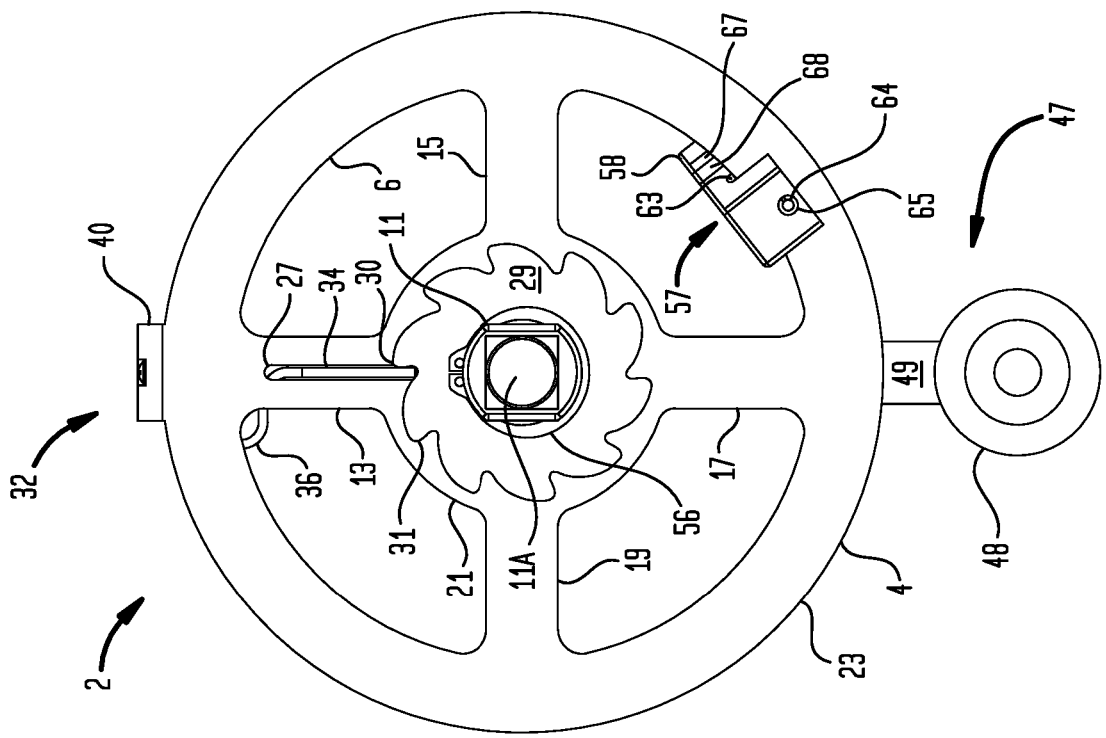
FIG. 9 is a right side view of an embodiment of the drum assembly, a ratchet, and hand crank.
Figure 8:
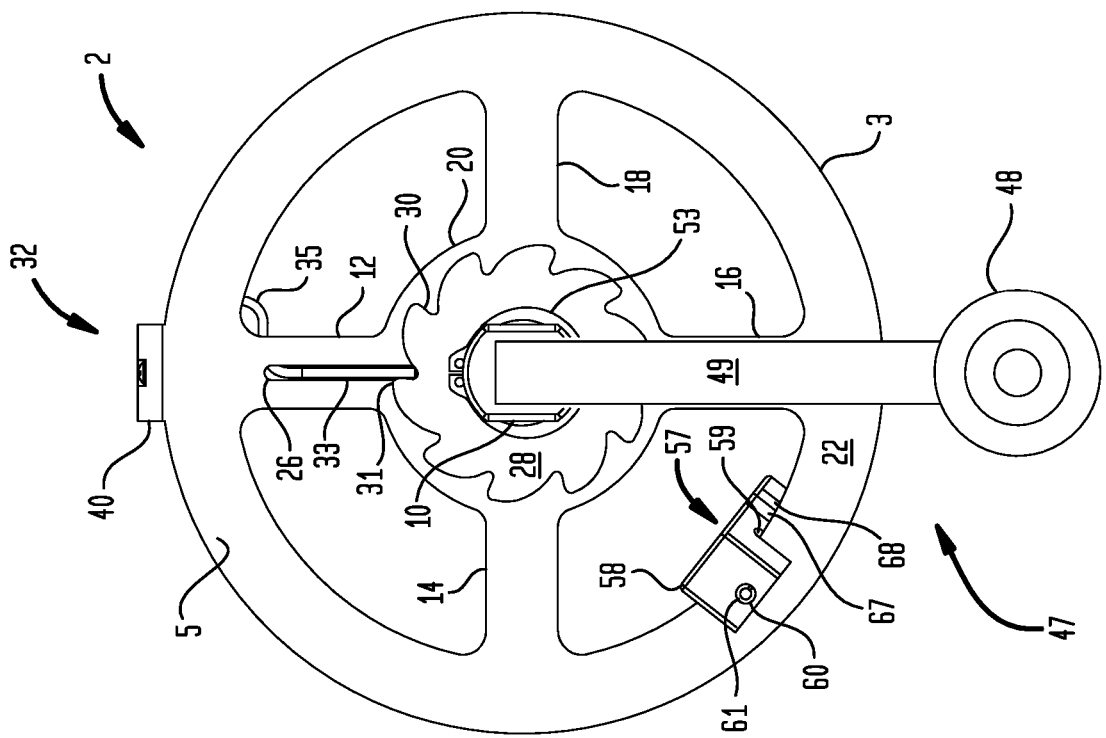
FIG. 8 is a left side view an embodiment of the drum assembly, a ratchet, and hand crank.

Now referring primarily to FIGS. 2 and 5, the spring-loaded member (37) is a spring operated pinching member in cooperative engagement with a pair of coil springs (38) and (39) of the pawl (32), which, in turn, urge the flanges (33) and (34) into and through the slots (26) and (27) to slidably engage (41) between the two or more gear teeth (30) and (31) of the pair of ratchets (28) and (29).

Referring again primarily to FIGS. 1 and 2, the spring-loaded member (37) can be releasably compressed (42) to simultaneously disengage the flanges (33) and (34) between the two or more gear teeth (30) and (31) of the pair of ratchets (28) and (29). The pair of flanges (33) and (34) when simultaneously released from engagement between the two or more gear teeth (30) and (31) upon compression of the spring-loaded member (37) toward a compression guide (40), enable rotation of the pair of ratchets (28) and (29) in either direction. When the spring-loaded member (37) and coil springs (38) and (39) are released from the compression, the flanges (33) and (34) are returned to selectively constrain the rotation of the pair of ratchets (28) and (29) in only one direction and to oppose rotation in an opposite direction.

Now referring primarily to FIG. 1, ratchet strap (43) can be pulled in a direction away (44) from the axle (7) in order to unwind the ratchet strap (43) from the axle (7). When the spring-loaded member (37) is compressed (42) against the compression guide (40), the flanges (33) and (34) are released from engagement to the two or more gear teeth (30) and (31) of the pair of ratchets (28) and (29), enable rotation of the pair of ratchets (28) and (29) in at least a direction away (44) from the axle (7) by pulling on the ratchet strap (43). Ratchet strap (43) includes a first end removably disposed in the slit of the axle (7) and a second end (45) oppositely disposed from the first end. Elongate member (46) between the first end and the second end (45) can be reeled off the axle (7) to extend outward in a direction away (44) form the axle (7). The ratchet strap (43) can, but not necessarily, be made from polyester fabric. In other embodiments, the ratchet strap (43) can be made from fabrics which are strong, durable, and have very little stretch.

With continuing reference primarily to FIGS. 2, 4, and 5, a hand crank (47) includes a handle knob (48), ratchet arm (49), a ratchet plug (50), and a ratchet plug end (51). The ratchet arm (49) of the hand crank (47) can be operable to enable rotation of the pair of ratchets (28) and (29). The ratchet plug end (51) of the hand crank (47) can, but not necessarily, be removably mateable with each one of the distal ends (10) and (11) of the axle (7).

In various embodiments, hand tools, including but not limited to, a ratcheting socket wrench, a ratcheting screwdriver, an impact driver, or an electric drill/driver with driver kit, can be used as a substitute for the hand crank (47) to operably enable rotation of the pair of ratchets (28) and (29). In one example, a cordless drill/driver with a ⅜ inch chuck size and ⅜ inch socket can be used to engage either one of the distal ends (10) and (11) of the axle (7). The examples of the hand tools are not intended to preclude embodiments which incorporate similar or equivalent tools or other devices that fasten or loosen fasteners, currently or prospectively available.

Now referring primarily to FIG. 4, the plug end (51) of the ratchet plug (50) of the ratchet arm (49) of the hand crank (47) is attached to magnet (52). The magnet (52) can enable the ratchet plug end (51) of the ratchet arm (49) to be magnetically removably mated to each one of the distal ends (10) and (11) of the axle (7). The magnet (52) can be a rare earth magnet. The illustrative examples of the magnet (52) of the hand crank (47) are not intended to preclude embodiments which incorporate similar or equivalent fasteners or other devices that mechanically join or removably affix two or more objects together, currently or prospectively available.

Still with continuing reference primarily to FIG. 4, the plug end (51) and magnet (52) are received by a first washer (53), which abuts ratchet (28). Ratchet (28) includes a rectangular hole (28') therethrough to receive the correspondingly complementary shape of the ratchet plug (50) of the ratchet plug end (51). Second washer (54), center bore (24) of drum wheel (3), and hole (28') of ratchet (28) and first washer (53) are collared on distal end (10) of the axle (7). Distal end (10) of axle (7) includes plug receiving bore (10 A) arc (10 B), cutaway (10 C) and groove (10 D). On the opposite distal end (11) of distal end (10) of the axle (7), plug receiving bore (11 A) arc (11 B), cutaway (11 C) and groove (11 D) are correspondingly complementary shaped to receive washer (55), center bore (25) of drum wheel (4), hole (29') of ratchet (29) and fourth washer (56). As described, each of the pair of ratchets (28), (29) can receive the plug end (51) of the hand crank (47) in use and operation.

Again referring primarily to FIG. 4, compression guide (40) of the pawl (32) bridges or spans the pair of drum wheels (3) and (4). Set screw (40 A) is received by through hole (40 B) of the compression guide (40) and threadably engaged to set screw hole (40 C) on drum wheel (3). Set screw (40 D) is received by through hole (40 E) of the compression guide (40) and threadably engaged to set screw hole (40 F) on drum wheel (4). The illustrative examples of the compression guide (40) of the pawl (32) are not intended to preclude embodiments which incorporate similar or equivalent fasteners or other devices that mechanically join or removably affix two or more objects together, currently or prospectively available.

Now referring primarily to FIGS. 4 through 11, a tether member (57) includes a housing (58). Housing (58) is shaped as a double, open-ended slider buckle. Recess (59) of the housing (58) of the tether member (57) mates with catch (62) of drum wheel (3). A peg (60) is received by peg hole (61) to removably mount the tether member (57) to drum wheel (3). Recess (63) of the housing (58) of the tether member (57) mates with catch (66) of drum wheel (4). Peg (64) is received by peg hole (65) to removably mount the tether member (57) to drum wheel (4). The tether member (57) is removably mounted between the pair of drum wheels (3) and (4) radially outward of the axle (7). The illustrative examples of the tether member (57) of the tie down (1) are not intended to preclude embodiments which incorporate similar or equivalent chains, or leashes, currently or prospectively available.

With continuing reference, primarily to FIGS. 1, 2, and 4 through 11, tether strap (69) includes a first end (70) coupled to a tether strap receiving first slit (67) and tether strap receiving second slit (68) of the tether member (57). Each of the pair of receiving slits (67), (68) are formed opposite the bending regions of the housing (58). The first end (70) of the tether strap (69) can enter into tether strap receiving first slit (67), over or under the tether housing (58), and into the tether strap receiving second slit (68). A second end (71) of the tether strap (69) is oppositely disposed from the first end (70). The tether strap (69) can, but not necessarily, be made from polyester fabric. In other embodiments, the tether strap (69) can be made from fabrics which are strong, durable, and have very little stretch. The illustrative examples of the pair of receiving slits (67), (68) of the tether housing (58) of the tether member (57) are not intended to preclude embodiments which incorporate similar or equivalent buckles, currently or prospectively available.

Now referring primarily to FIGS. 1 and 2, a first S-hook fastener (73) is coupled to ratchet strap second end (45) of the ratchet strap (43) and a second S-hook fastener (74) is coupled to tether strap second end (71) of the tether strap (69). The S-hook fasteners (73) and (74) include a closed end for coupling to the ratchet strap second end (45) and tether strap second end (71). The S-hook fasteners (73) and (74) can, but not necessarily, be constructed of steel. The illustrative examples of the S-hook fasteners (73) and (74) of the tie down (1) are not intended to preclude embodiments which incorporate similar or equivalent hooks or types of hook ends, currently or prospectively available.

Now referring primarily to FIG. 2, counter-clockwise (72) rotation of hand crank (47) and (77) while the pair of flanges (33) and (34) are in simultaneous engagement between at least two gear teeth (30) and (31) of each of the ratchets (28), (29) can selectively constrain rotation of the pair of ratchets (28) and (29) in only one direction (77) and oppose rotation in an opposite direction.

Figure 3:
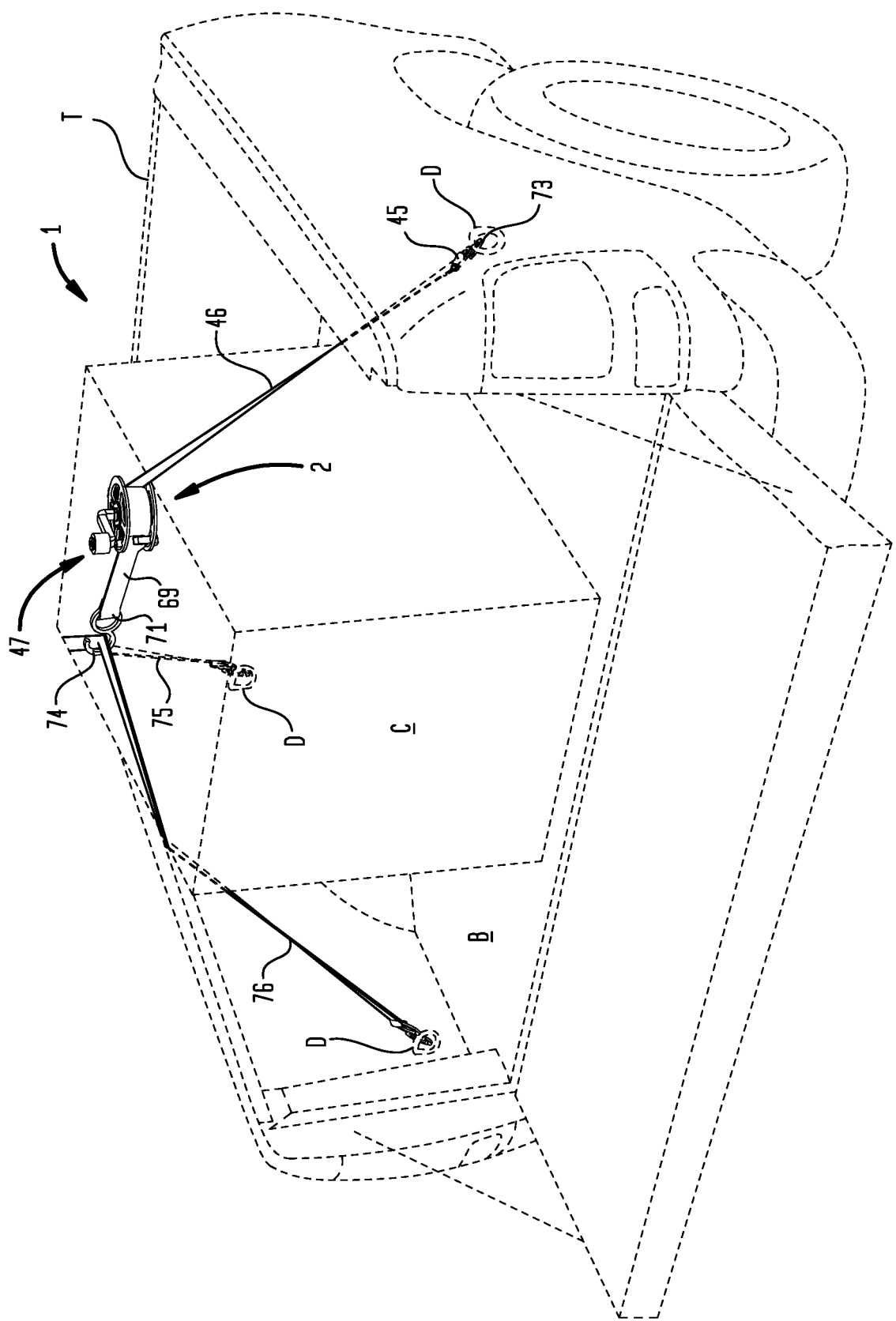
FIG. 3 is a top, right perspective view of an embodiment of a tie down with ratchet sustaining a load in a bed of a pickup truck.

Now referring primarily to FIG. 3, the tie down (1) according to embodiments is secured to D-rings (D) within a pickup truck (T) bed (B) for cargo management of cargo (C). Strap (75) and strap (76) can couple to fastener (74) of tether strap (69) allowing even more distribution of weight to sustain the load. The drum assembly (2) and hand crank (47) can be turned over to rest on drum wheel (4), which can include a collar, casing, housing or the like having a scratch-resistant surface to avoid damaging the surface of the cargo (C). In various other embodiments the tie down (1) can be used on trailers, racks, walls, ceilings, floors and more.

As can be easily understood from the foregoing, the basic concepts of the present invention may be embodied in a variety of ways. The invention involves numerous and varied embodiments of an antenna structure, a method of making an antenna structure, and the component parts thereof, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "selectively constrain rotation" should be understood to encompass disclosure of the act of "selectively constraining rotation"—whether explicitly discussed as mechanically, electrically, electromagnetically, or physically coupled thereto or not—and, conversely, were there effectively disclosure of the act of "selectively constraining rotation", such a disclosure should be understood to encompass disclosure of a "an apparatus to selectively constrain rotation" and even a "means for selectively constraining rotation." Such alternative terms for each element are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) the tie down with ratchet apparatus disclosed and described, ii) the related operation disclosed and described, iii) similar, equivalent, and even implicit variations of each of the structure and operation, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:
1. An apparatus, comprising:
   a drum assembly including:
      an axle having a slit disposed within an axle sidewall;
      a pair of drum wheels correspondingly coupled to distal ends of said axle with said slit disposed between said pair of drum wheels;
   a pair of slots, one of said pair of slots disposed within each of said pair of drum wheels;
   a pair of ratchets having at least two gear teeth, one of said pair of ratchets coupled to each of said distal ends of said axle adjacent an outward facing side of each of said pair of drum wheels;
   a pawl including:
      a pair of flanges, one of said pair of flanges correspondingly slidably engaged in one of said pair of slots disposed within said pair of drums, said pair of flanges of said pawl simultaneously slidably engageable between said at least two gear teeth of each of said pair of ratchets to selectively constrain rotation of said pair of ratchets; and
      a spring-loaded lever releasably compressible to simultaneously disengage each of said pair of flanges from between said at least two gear teeth of each of said pair of ratchets.

2. The apparatus of claim 1, further comprising a ratchet strap having a first end removably disposed in said slit of said axle, a second end oppositely disposed from said first end, said second end extending away from said axle, and an elongate member between said first end and said second end, said elongate member wound around said axle sidewall of said axle.

3. The apparatus of claim 2, further comprising a tether removably mounted between said pair of drum wheels radially outward of said axle.

4. The apparatus of claim 3, further comprising a tether strap having a tether strap first end coupled to said tether member.

5. The apparatus of claim 4, further comprising a first fastener coupled to said tether strap second end.

6. The apparatus of claim 5, wherein said first fastener comprises a first S-hook.

7. The apparatus of claim 2, further comprising a second fastener coupled to said second end of said ratchet strap.

8. The apparatus of claim 7, wherein said second fastener comprises a second S-hook.

9. The apparatus of claim 1, wherein said pawl further including a span spanning said pair of drum wheels, said spring-loaded member compressible toward said compression guide.

10. The apparatus of claim 9, wherein said pair of flanges in simultaneous engagement between said at least two gear teeth of each of said pair of ratchets to selectively constrain rotation of said pair of ratchets in only one direction and to oppose rotation in an opposite direction.

11. The apparatus of claim 10, wherein said pair of flanges simultaneously released from engagement between said at least two gear teeth upon compression of said spring-loaded lever toward said compression guide enables rotation of said pair of ratchets in said one direction or said opposite direction.

12. The apparatus of claim 1, further comprising a ratchet arm having a ratchet plug end removably mateable with each one of said distal ends of said axle, said ratchet arm operable to enable rotation of said pair of ratchets.

13. The apparatus of claim 12, wherein said ratchet plug end of said ratchet ail magnetically removably mated to each one of said distal ends of said axle.

14. An apparatus, comprising:
   a ratchet tensioner comprising:
      an axle rotatably mounted between a pair of drum wheels;
      at least one ratchet having at least two gear teeth, said at least one ratchet fixedly mounted to said axle on an outward side of said pair of drum wheels;
      a pawl including:
         a span fixedly attached to said pair of drum wheels in parallel alignment with said axle;
         a pair of flanges, each of said pair of flanges correspondingly slidably engageable with one of a pair of slots disposed in said pair of drum wheels, said pair of flanges of said pawl simultaneously slidably engageable between said at least two gear teeth of said at least one ratchet to constrain rotation of said at least one ratchet;
         a spring-loaded lever compressible toward said span to release engagement of said pair of flanges with said at least one ratchet;

a first strap having a first end removably anchored to said axle, a second end oppositely disposed from said first end, and an elongate member between said first end and said second end, said elongate member of said first strap extendable in a first direction away from said axle, and a second strap, said second strap secured to a tether on a first end, said tether coupled to said ratchet tensioner to introduce said second strap in a second direction opposite said first strap.

15. An apparatus, comprising:

a length of first strap, said first strap comprising a distal end having a hook;

an axle configured to spool said length of said first strap, said first strap comprising a proximal end removably anchored to said axle;

a first ratchet wheel and a second ratchet wheel oppositely disposed on distal ends of said axle; said first ratchet wheel and said second ratchet wheel coupled in a cooperating rotating relationship with one another relative to said axle; said first ratchet wheel and said second ratchet wheel comprising a plurality of teeth extending radially from each perimeter of each of said first ratchet wheel and said second ratchet wheel;

a pawl including:
  a pair of flanges, each of said pair of flanges correspondingly slidably engaged with one of a pair of slots, each of said pair of slots formed within a sidewall of a first drum wheel and a second drum wheel; said first drum wheel and said second drum wheel oppositely disposed on said distal ends of said axle with said first ratchet wheel and said second ratchet wheel disposed on an outward face of said each sidewall of said first drum wheel and said second drum wheel;
  a spring-loaded lever coupled to said pair of flanges, said spring-loaded lever releasably biased to correspondingly engage said pair of flanges with first ratchet wheel and said second ratchet wheel to constrain said plurality of teeth;

a second strap releasably secured to a tether, said tether removably mounted between a plurality of radial spokes formed within said each sidewall of said first drum wheel and said second drum wheel.

* * * * *